United States Patent [19]

Bartscher et al.

[11] Patent Number: 5,226,315
[45] Date of Patent: Jul. 13, 1993

[54] DEVICE FOR SURVEILLANCE OF A GAS-FILLED CHAMBER TO MONITOR LEAKS

[75] Inventors: Peter Bartscher, Hanover; Gerhard Stegemann, deceased, late of Salzhemmendorf by Marita Stegemann, legal representative and Ursula Stegemann, legal representative; Günther Singbartl, Hanover; Helmut Ulrich, Springe, all of Fed. Rep. of Germany

[73] Assignee: WABCO Westinghouse Fahrzegbremsen GmbH, Hanover, Fed. Rep. of Germany

[21] Appl. No.: 597,732

[22] Filed: Oct. 15, 1990

[30] Foreign Application Priority Data

Oct. 14, 1989 [DE] Fed. Rep. of Germany ........ 3934415

[51] Int. Cl.⁵ .............. B60C 23/04; G01L 7/16; G01L 19/04
[52] U.S. Cl. ................... 73/48; 73/146.8; 200/61.25
[58] Field of Search ........... 73/146.8, 48, 40; 340/442; 200/61.25

[56] References Cited

U.S. PATENT DOCUMENTS

| | | | |
|---|---|---|---|
| 4,143,545 | 3/1979 | Sitabkhan | 73/146.8 |
| 4,254,312 | 3/1981 | Migrin et al. | 73/146.8 X |
| 4,335,283 | 6/1982 | Migrin | 73/146.8 X |
| 4,686,855 | 8/1987 | Smith | 73/146.8 |

FOREIGN PATENT DOCUMENTS 3525672 1/1987 Fed. Rep. of Germany ..... 73/146.8

Primary Examiner—Hezron E. Williams
Assistant Examiner—Joseph W. Roskos
Attorney, Agent, or Firm—Horst M. Kasper

[57] ABSTRACT

A device for monitoring the sealing properties of a gas-filled chamber is provided. The temperature-sensitive device is formed out of a thermally-reacting element (14, 19, 20, 24). The element changes its dimensional length depending on a temperature change. The element (14, 19, 20, 24) is disposed between a pressure measurement device (6, 11) and a valve (7, 8; 9, 10), serving as a signal generator. The device can be used for a monitoring of the pressure in a vehicle tire or of the gas density in a vehicle tire.

34 Claims, 4 Drawing Sheets

DEVICE FOR SURVEILLANCE OF A GAS-FILLED CHAMBER TO MONITOR LEAKS

BACKGROUND OF THE INVENTION

1. Field of the Invention

The invention relates to a device for monitoring the sealing properties of a gas-filled chamber in connection with a pressure measurement device for measuring the gas pressure present in the chamber.

2. Brief Description of the Background of the Invention Including Prior Art

Such a device is known from the European Patent EP-B-0,248,821. This known device serves for monitoring the sealing properties of a vehicle tire and, in this sense, the device scans the tire pressure with a pressure measurement device. The measurement value resulting from the signal of the pressure measurement device is evaluated with the aid of a switching circuit. The switching circuit exhibits a switching threshold corresponding to the nominal tire pressure such that, in case of a falling below the nominal tire pressure, a signal is generated with the switching device.

Since the tire is subject to temperature variations, the tire pressure changes with these temperature variations. As a consequence, the preset switching threshold value deviates more or less from the nominal tire pressure depending on the temperature level. Therefore, the pressure measurement device is furnished with a temperature-sensitive device, which can be actuated depending on the tire pressure and which serves to compensate the switching threshold to the nominal tire pressure changing with temperature level.

A reference pressure box, closed on all sides, serves in this case as a temperature-sensitive device. The reference pressure box is filled with a medium. The pressure of the medium is to correspond to the nominal tire pressure. The reference pressure box is surrounded by the tire temperature and can expand or contract according to the variations in the tire temperature. This change in shape of the reference pressure box is employed to influence the pretensioning of a spring-loaded switching device such that the switching threshold value is adapted to the temperature-dependent pressure change of the nominal tire pressure.

However, this device is only functioning as long as no leak occurs at the reference pressure box. In case of such a leak at the reference pressure box, there would occur a pressure exchange and balancing between the tire and the reference pressure box.

In case of a leaking reference pressure box, the pressure balancing occurs between the tire and the reference pressure box and the pressure-sensitive switching device is actuated and consequently a signal is generated. This signal, however, is not clearly identifiable because either a tire pressure below a recommended limit or a leakage of the reference pressure box is indicated thereby.

A requirement that the reference pressure box remains ready for operation over a relatively long operating time without the recited functional interference, can only presuppose a very expensive production method. Given the present doubts regarding operational safety, there would in addition be required repeated leakage controls or an expensive monitoring at the reference pressure box.

A pressure measurement device is known from the German Patent DE-PS 2,813,058-C2, where a pressure-sensitive device is formed by a spring-loaded piston. The piston can receive the tire pressure against the force of the spring. The pretensioning of the spring is set relative to the nominal tire pressure such that, in case of a pressure drop below a recommended limit, the spring force prevails and the piston is moved into a signal-generating position. Since this device does not exhibit any means to which the tire pressure can be applied, which means would solely serve to the recognition and the evaluation of the tire gas temperature, the leakage problem described in the European Patent EP-B-0,248,821 cannot occur in this case. Instead, however, the disadvantage has to be accepted that a switching threshold, once fixed by the spring force, cannot be adapted to the nominal tire pressure since this nominal tire pressure is in fact a falsified tire pressure due to variations caused by temperature interaction.

The German Patent Application Laid Out DE-AS 1,183,328 to Jack Kingsley Gould teaches a thermostatically controlled valve responding quickly to temperature changes. The valve is furnished for limiting the temperature of a liquid, wherein a temperature limit can be reached within a relatively short time. As the present invention is directed to the sealing of a gas-filled chamber, it appears that this reference only tangentially concerns the invention device.

The German Patent DE-PS 1,106,095 to Hubert Jung teaches an apparatus for testing the seal based on a temperature-compensated difference pressure determination. The reference shows bellows-type structures in the sketches, however, no threshold control of the gas density appears to be taught in this reference.

The German Patent Application Laid Open DE-OS 2,941,343-A1 to Rudolf Vollmer teaches a thermostatic valve and, in particular, a thermostatic heating body valve. The reference requires an additional working element subjected to a heating agent, where the operating motion, in case of a parallel temperature change, is opposite to that of ambient air work element. It appears that this reference thermostatic valve does not operate to furnish a threshold value for a continuous gas-density-level threshold control in a gas chamber.

The German Patent Application Laid Open DE-OS 2,930,340 to Heinz Schmidl et al. teaches a method for testing the sealing capabilities of tanks. The reference employs temperature measurement apparatus coordinated to each container and feeding of reference values therefrom to an electronic computer for processing and followed by a comparison of the calculated values. It appears that this control system does not teach the automatic actuation of a valve upon passage of a gas density in a pressure chamber below a predetermined gas density level.

The German Patent Application Laid Open DE-OS 2,847,119 to William Barrie Hart teaches a temperature-sensitive control device. The reference teaches that a control element is moved, in case of a temperature change, within the transition temperature region along a path and that devices are furnished in order to select a part of the transition temperature region for a certain region of shift values of the control element. Furthermore, an adjustment means is furnished in order to set that temperature within a selected part of the transition temperature region, where the control element is disposed in a predetermined control position. However, this reference does not provide a threshold control, where the threshold level is determined by the gas density independent of temperature variations.

The German Patent Application Laid Open DE-OS 2,436,812 to Georgi Cwetanski teaches an encapsulated bimetal device. The reference shows in FIGS. 1 and 3 the structure bimetallic disks, which can expand based on temperature changes.

The German Patent Application Laid Open DE-OS 2,358,649 to Mario Posnansky teaches a measurement device influenced by interfering ambient-temperature changes. The structure taught in the reference comprises a compensation member, which changes the size of a volume-containing medium under the influence of an interfering temperature change, where the dimensions and the thermal expansion number of the compensation member are selected under consideration of the thermal expansion number and under consideration of the medium comprised in the predetermined space such that the influence of interfering temperature changes on the device is compensated. It appears however that this reference does not teach a device which is capable of setting a gas density threshold level for actuating a valve based on a change in gas density independent of a temperature change.

The German Patent Application Laid Open DE-OS 2,111,968 to Costantino Broetto teaches a quick reacting bimetal thermostat. The reference teaches in FIG. 2 a disk-shaped bimetal element 7, which will change its shape based on temperature changes.

The French Patent 2,098,959 to Edmond Ventre teaches a motor means based on thermal effect. FIG. 3 of this reference illustrates a helical metallic part made up of two rods 20, 22, which will change its configuration based on temperature changes. However, this reference is clearly not addressed to the problem of setting a constant threshold level for monitoring the gas density in a gas chamber.

The German Patent Application Laid Open DE-OS 2,856,313 to Marc Deman teaches a thermostatic element. This element includes an expandable material on a wax basis maintained in a chamber. Reference to a threshold control for the density of a gas is not present in this reference.

SUMMARY OF THE INVENTION

1. Purposes of the Invention

It is an object of the present invention to provide a pressure measurement device for monitoring the sealing properties of a gas-filled chamber, where a switching device of the gas-filled chamber exhibits a switching threshold value changeable depending on the gas temperature, and wherein the means for the temperature-dependent change of the switching threshold value become effective independent of the prevailing level of the gas pressure.

It is a further object of the invention to provide a simple means which allows to control a maintaining of a level of a substantially constant gas density in a vehicle tire independent of pressure changes.

It is yet a further object of the present invention to provide a device which is capable of safely indicating any leaks which might occur in a vehicle tire.

These and other objects and advantages of the present invention will become evident from the description which follows.

2. Brief Description of the Invention

The present invention provides for a device for monitoring of sealing properties of a gas-filled chamber. A piston is loaded with a spring and connected to a gas-filled chamber, thereby forming a measurement device. The piston receives the gas pressure against a force of the spring for measuring the gas pressure prevailing in the chamber and for furnishing a measurement signal. A switching device is operationally connected to the pressure measurement device for receiving the measurement signal. The switching device serves for functionally employing the measurement signal of the pressure measurement device. A temperature-sensitive device is formed by an intermediate member for defining of a switching threshold value. The temperature-sensitive device changes its longitudinal dimension depending on temperature. The intermediate member is disposed serially acting relative to the spring generating the spring force.

Means can be provided for setting the switching threshold for the switching device. The switching threshold can correspond to a preset nominal gas density for a certain gas type in the chamber.

The temperature-sensitive device can be constructed such as to compensate the change of the spring length, generated by a force change on the piston induced by a change in the gas pressure of a gas of nominal gas density in the chamber corresponding to a temperature change, by a corresponding opposite length change as compared to the spring length. The temperature-sensitive device can maintain the switching threshold such as to correspond substantially to a certain gas density value of a certain gas type in the chamber.

The chamber is to be furnished by a vehicle tire containing a certain gas type. The switching threshold can correspond to a preset nominal gas density value in the vehicle tire for said certain gas type. The preset nominal gas density value can be sufficiently high as to still allow tire operation over a range of desired vehicle tire temperatures.

The temperature-sensitive device can be formed by at least one thermally-reacting shaped part. The temperature-dependent dimensional change of the shaped part can serve for generating a contact position change adjusting the switching threshold depending on the pressure of the gas. The thermally-reacting shaped part can be formed out of a bimetal sheet. The shaped part can be formed as a spiral having a first spiral end and having a second spiral end. A torsioning motion of the first spiral end relative to the second spiral end can be generated based on the temperature-dependent dimensional change of the shaped part.

The shaped part can be formed as a spiral in the kind of a helical spring. One of the spiral ends can be rigidly clamped. Means can be provided for transforming the torsioning motion of the free spiral end into a longitudinal linear motion. The means for transforming the torsioning motion of the free spiral end into the longitudinal linear motion can be formed by a linear drive. The linear drive can be in operating connection with the free spiral end. The linear drive can be formed in the kind of a screw bolt—nut—connection.

The temperature-sensitive device can be formed by at least one disk. A form change of the disk can be a change in a degree of bulging of the disk.

Alternatively, the temperature-sensitive device can be formed by at least one U-shaped part having two arms. A form change of the U-shaped part can be generated by an opening and a closing of its arms.

Alternatively, the temperature-sensitive device can be formed by an expansion-material work element exhibiting a temperature-sensitive longitudinal dimension change. The longitudinal dimension change of the expansion-material work element can be linear relative to a temperature change. The longitudinal dimension of the expansion-material work element can be substantially proportional to the absolute temperature of the expansion-material work element over an operating range of the expansion-material work element. The longitudinal dimension change of the expansion-material work element can be non-linear relative to a temperature change.

The device can serve for monitoring sealing properties of a vehicle tire.

A monitoring method for sealing properties of a gas-filled chamber comprises the following steps: A piston is loaded with a spring. A switching device is operationally connected to the piston for generating a measurement signal. The piston is connected to a gas-filled chamber. The piston is subjected to the gas pressure prevailing in the gas-filled chamber and directed opposite to the force of the spring. An intermediate member is disposed serially acting relative to the spring generating the spring force. A temperature-sensitive device is formed with the intermediate member for defining of a switching threshold value and for changing its longitudinal dimension depending on temperature. The gas pressure prevailing in the chamber is measured. The measurement signal is furnished. The measurement signal is functionally employed.

A switching threshold can be set for the switching device. The switching threshold can correspond to a preset nominal gas density for a certain gas type in the chamber.

The temperature sensitive device can be constructed such as to compensate the change of the spring length, generated by a force change on the piston induced by a change in the gas pressure of a gas of nominal gas density in the chamber corresponding to a temperature change, by a corresponding opposite length change as compared to the spring length.

The switching threshold can be maintained such as to correspond substantially to a certain gas density value of a certain gas type in the chamber with the temperature-sensitive device.

The chamber is to be furnished by a vehicle tire containing a certain gas type. A switching threshold can be set corresponding to a preset nominal gas density value in the vehicle tire for said certain gas type. The preset nominal gas density value can be sufficiently high as to still allow tire operation over a range of desired vehicle tire temperatures.

In accordance with the present invention, there results the advantage that the invention device operates substantially without any service requirements because a function monitoring is not required during the duration of the operation of the invention device.

The invention further exhibits the advantage that it can be realized with less time, equipment, and material requirements as compared to the initially recited device.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

The invention device has the purpose to compensate for temperature-dependent pressure variations of a gas-pressure to be monitored. The invention device assures that the monitored density of the gas in a vehicle tire remains constant. Independent of the temperature changes, the invention device is capable of indicating changes in the gas density in the tire caused by leaks and deviating from recommended tire-pressure limits.

Figure 1:
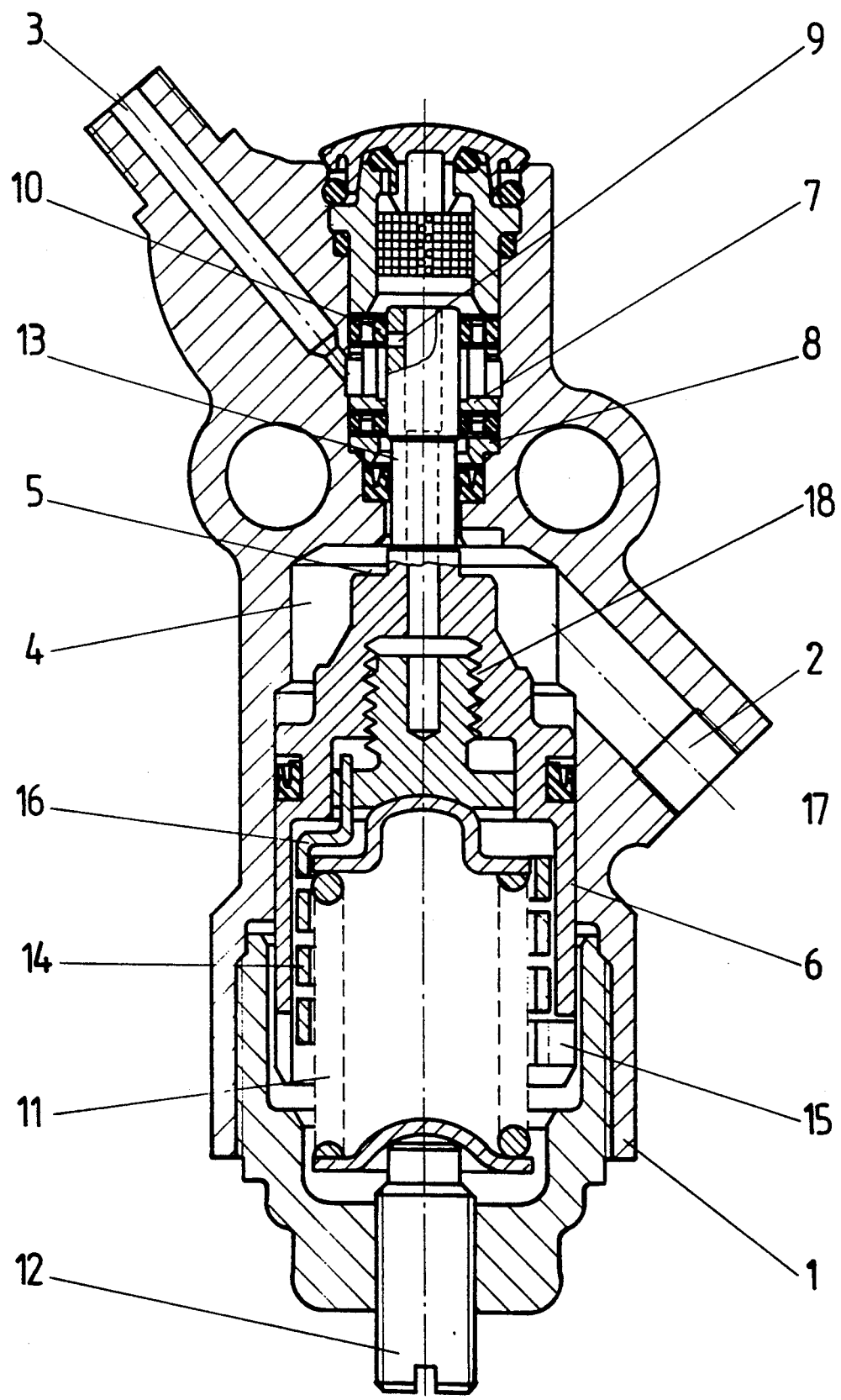
FIG. 1 is a sectional view of a device for monitoring the sealing properties of a gas-filled chamber with a temperature-sensitive device employing a thermally-reacting part formed as a spiral.

FIG. 1 illustrates a casing 1 with an inlet 2 and an outlet 3 as well as with a pressure chamber 4. The pressure chamber 4 is delimited by the surrounding casing 1 and by a movable wall 5. The wall 5 is formed by a piston 6. The pressure chamber 4 can be filled with gas via the inlet 2. The gas to be filled into the pressure chamber 4 is the same gas as that gas of which the pressure is to be monitored. The inlet 2 can be connected to the outlet 3 via an inlet valve 7, 8. The inlet valve 7, 8 is formed in the kind of a slider valve. Alternatively, the inlet valve 7, 8 can also be formed in an appropriate embodiment as a seat valve. The outlet 3 can be connected via an outlet valve 9, 10 to the atmosphere. The inlet valve 7, 8 and the outlet valve 9, 10 are actuable depending on the position of the piston 6.

The piston 6 receives the force of a spring 11, which acts in the direction of the pressure chamber 4. It is conceivable that the piston 6 can be formed by a membrane which is correspondingly shaped and connected to the casing 1. The force of the spring 11 can be adjusted with a set screw 12 such that, in case of a preset nominal pressure in the pressure chamber 4, there is provided a switching threshold where the piston 6 is disposed in a position in which the inlet valve 7, 8 is closed. When the pressure in the pressure chamber 4 falls below the nominal pressure, the force of the spring 11 prevails. This brings about that a valve member 13, movable with the piston 6, is moved in opening direction of the inlet valve 7, 8.

The switching device, including the spring-loaded piston 6 and the valve device, comprised of inlet valve 7, 8 and outlet valve 9, 10, is in actuating connection with a temperature-sensitive device 14, as shown in FIG. 1. The temperature-sensitive device 14 can be actuated with the temperature and reacts to temperature changes associated with changes of the pressure level to be monitored. The temperature-sensitive device 14 serves to adapt the switching threshold to the pressure change based on temperature change. The temperature-sensitive device 14 serves to adapt the switching threshold such that a switching occurs for a certain gas density independent of the temperature of the pressure level. The temperature-sensitive device 14 is formed according to FIG. 1 by a thermally-reacting shaped part. The shaped part representing the temperature sensitive device 14 is formed as a spiral, wherein, based on a temperature-dependent shape change there can be generated a torsion of the two spiral ends 15 and 16 relative to each other. The spiral shape can be formed as a helical spring, as illustrated in FIG. 1.

The spiral shaped part representing the temperature-sensitive device 14 is secured at one spiral end 15 against shifting versus the piston 6. The free spiral end 16 is in operating connection with a linear drive 17, 18. The rotation of the free spiral end 16 is transformed into in a longitudinal motion with the linear drive 17, 18. The linear drive 17, 18 is formed by a nut 17—screw bolt 18—connection. With the longitudinal motion, caused by temperature variations, the stroke, required for indicating a pressure drop in the tire, is maintained constant for an opening of the valve 7, 8. This means that the position of the valve member 13 remains unchanged until the opening of the inlet valve 7, 8 such that the switching threshold of the switching device, given by the nominal pressure, is adjusted to the nominal pressure to be newly set based on the temperature change.

Figure 2:
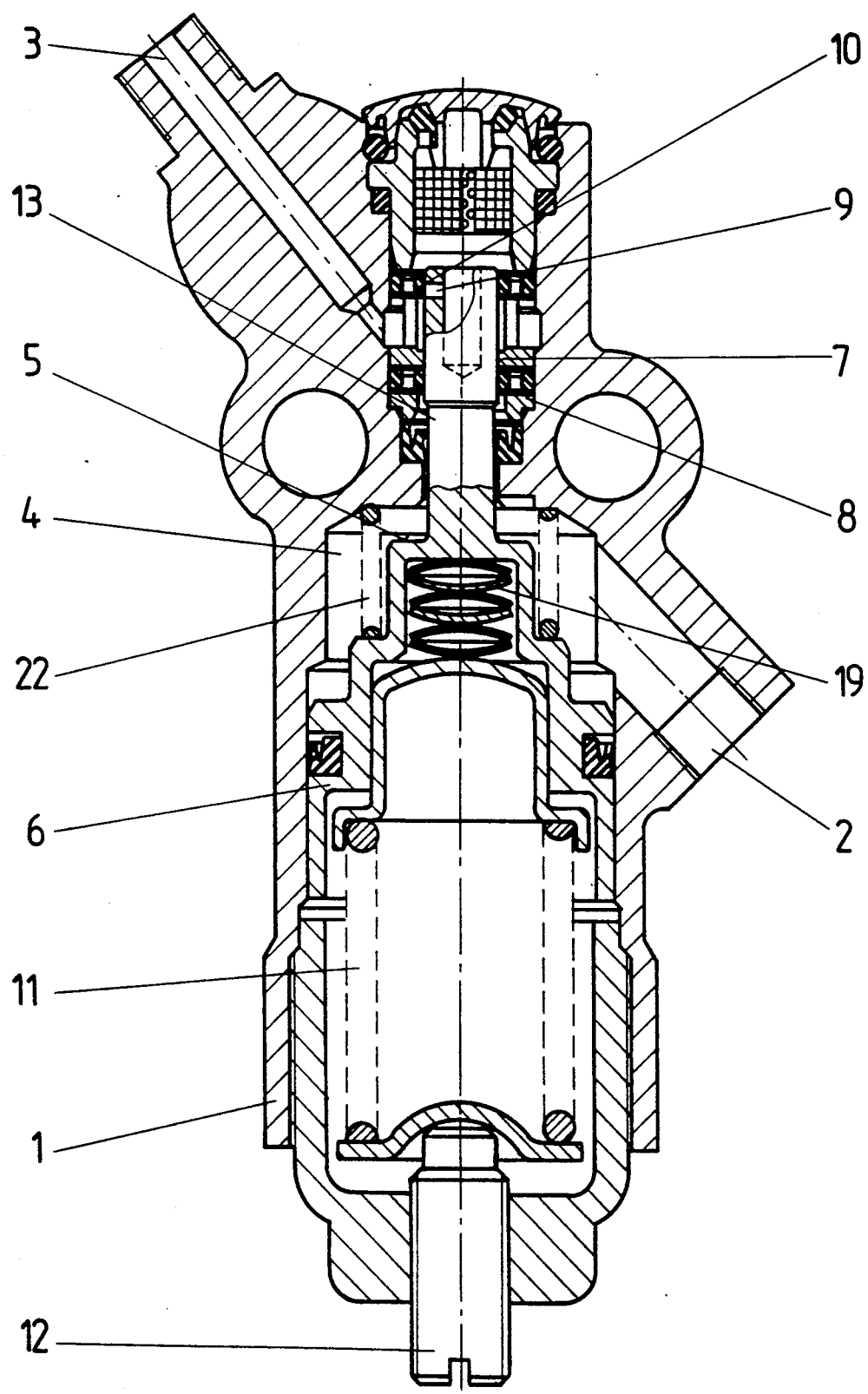
FIG. 2 is a sectional view of a second embodiment of a device for monitoring the sealing properties of a gas-filled chamber with a temperature-sensitive device employing thermally-reacting disks.
Figure 3:
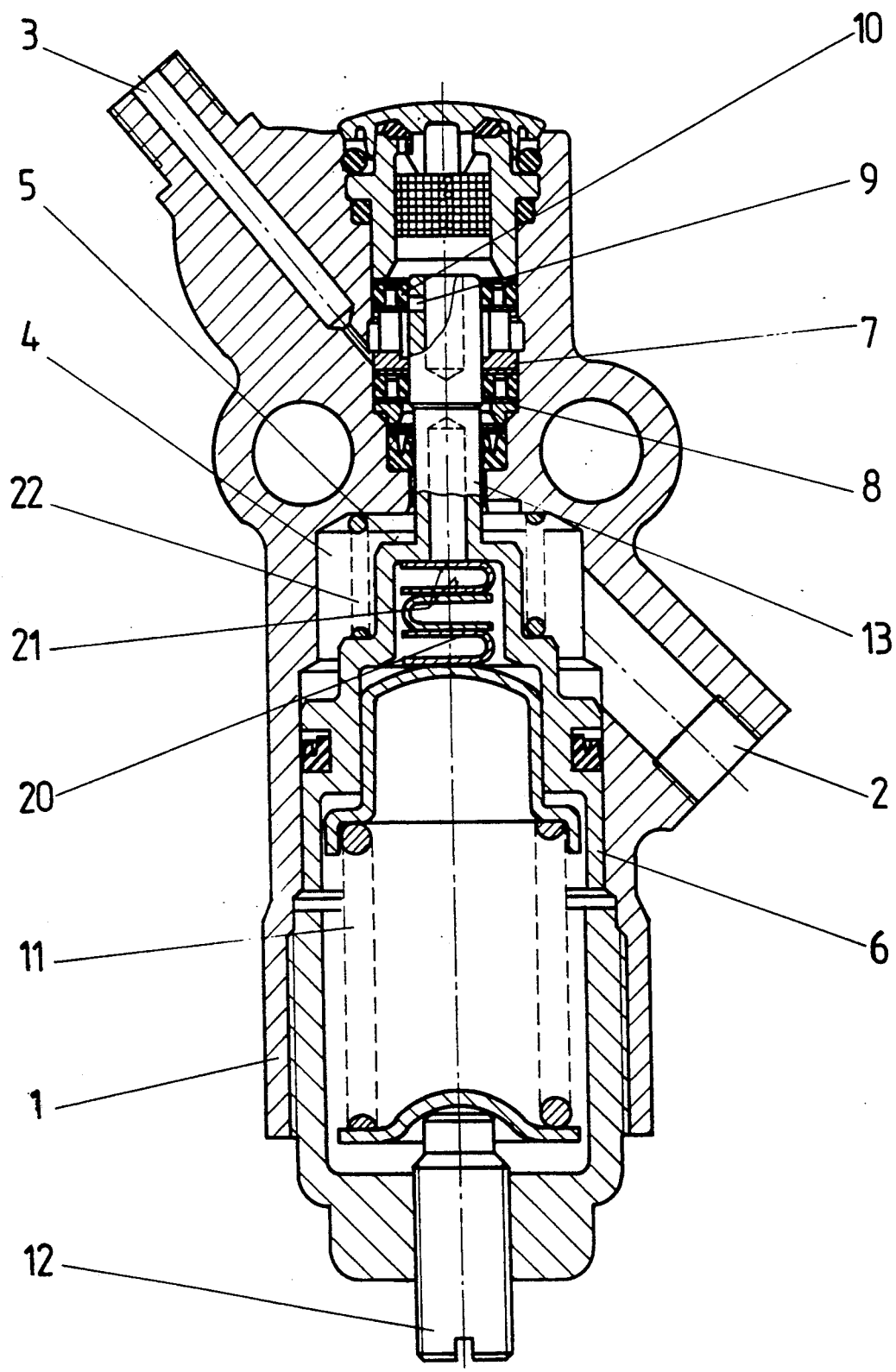
FIG. 3 is a sectional view of a third embodiment of a device for monitoring the sealing properties of a gas-filled chamber with a temperature-sensitive device employing thermally-reacting U-shaped parts.
Figure 4:
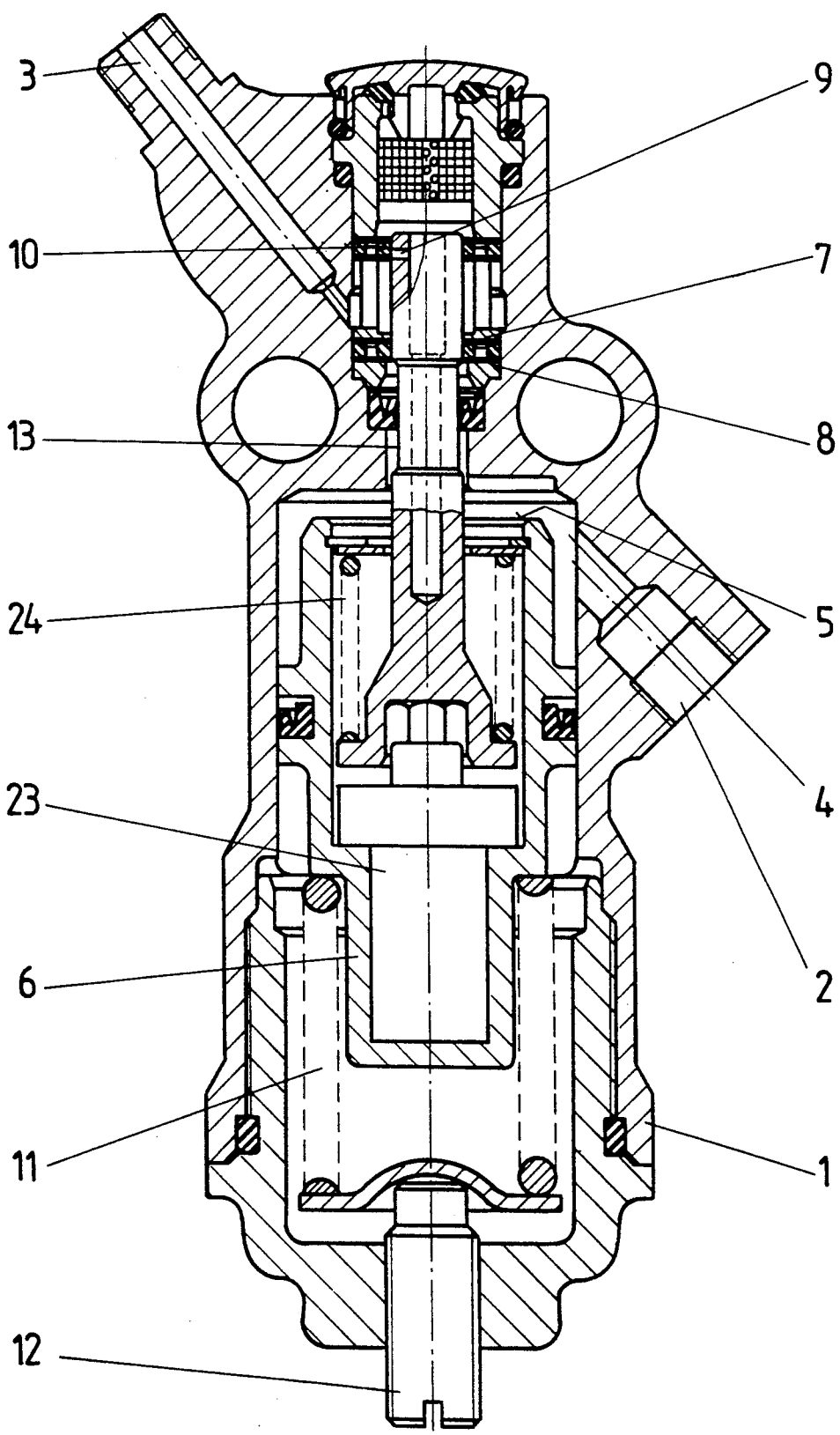
FIG. 4 is a sectional view of a fourth embodiment of a device for monitoring the sealing properties of a gas-filled chamber with a temperature-sensitive device employing an expansion-material work element.
Figure 1:
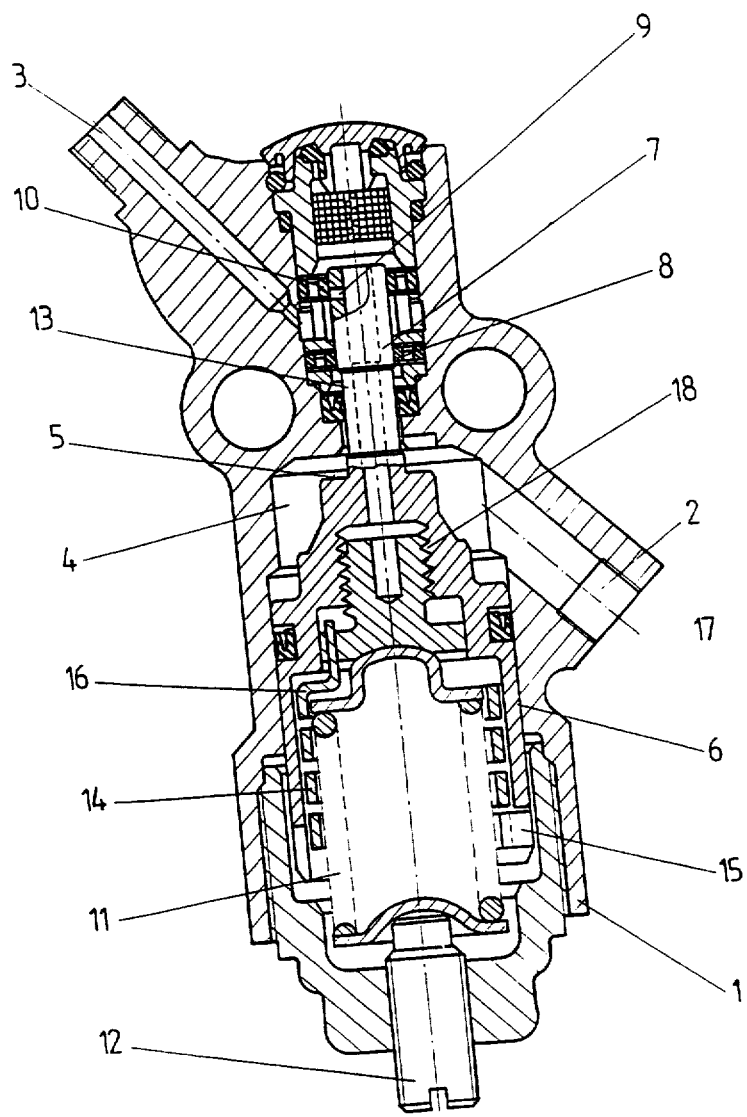
Figure 2:
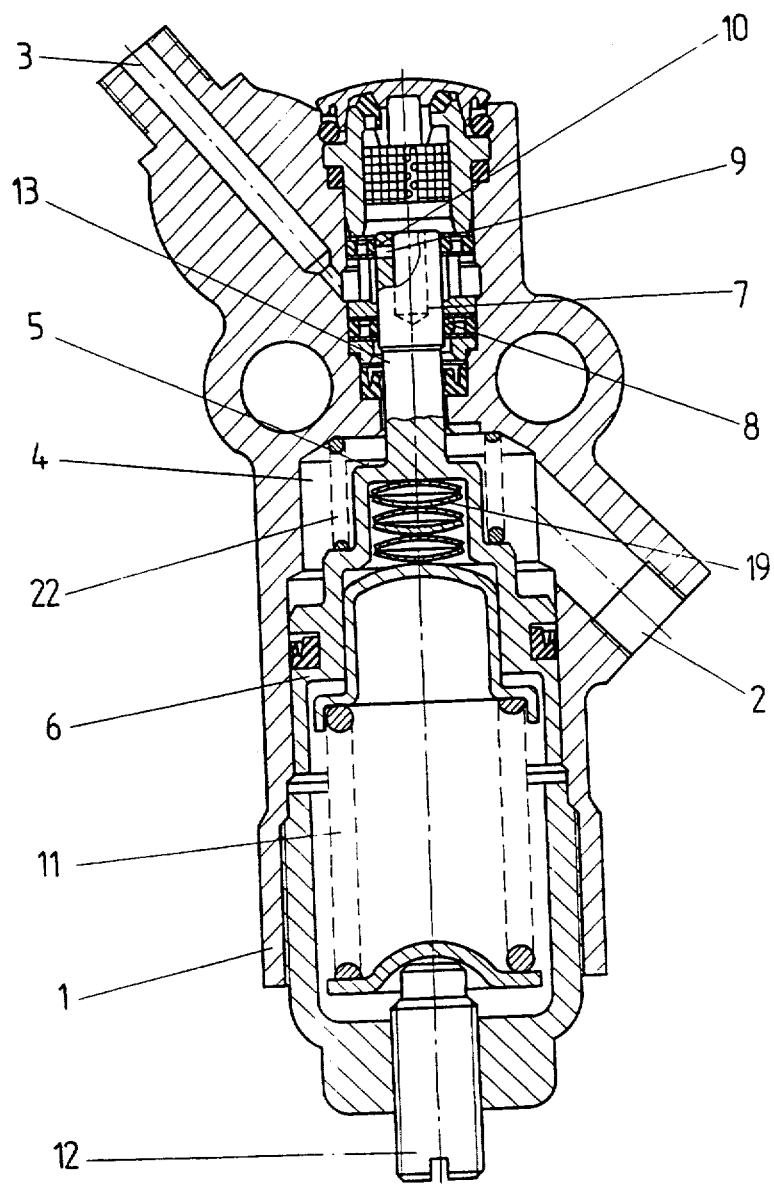
Figure 3:
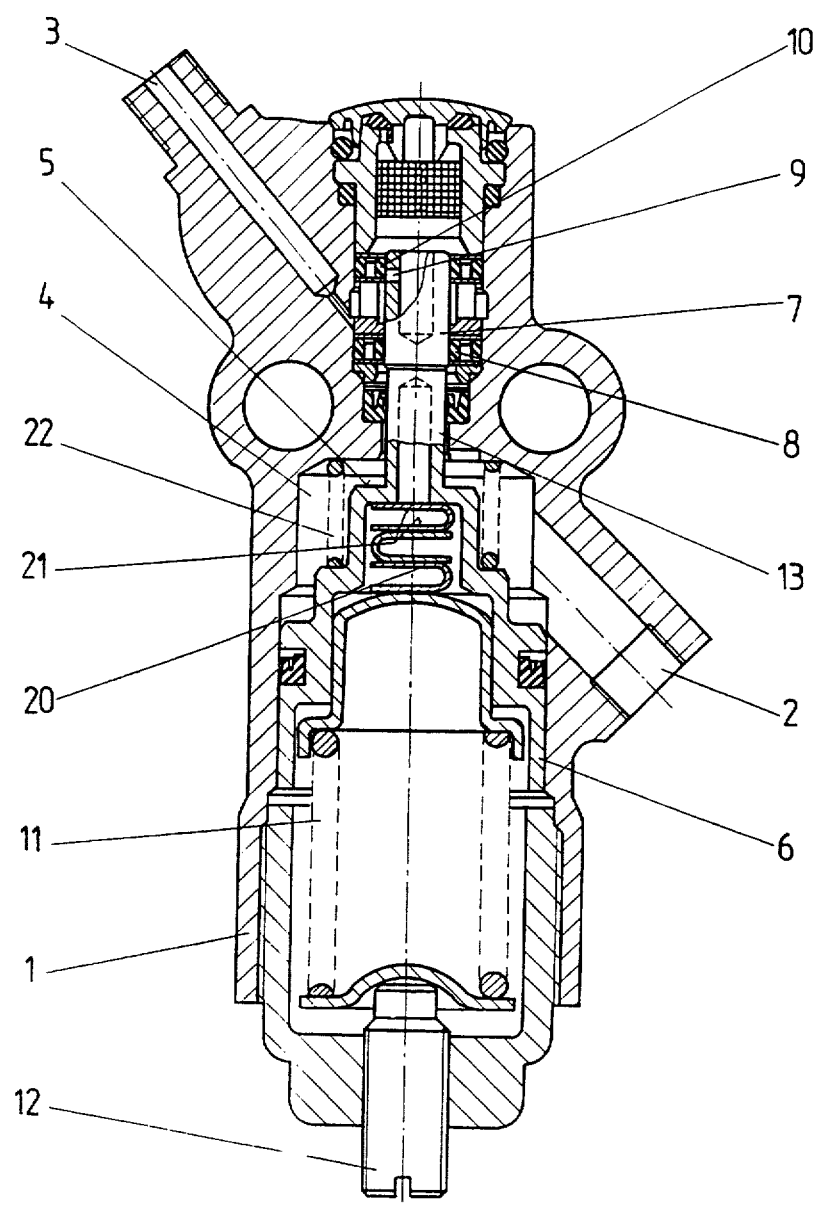
Figure 4:
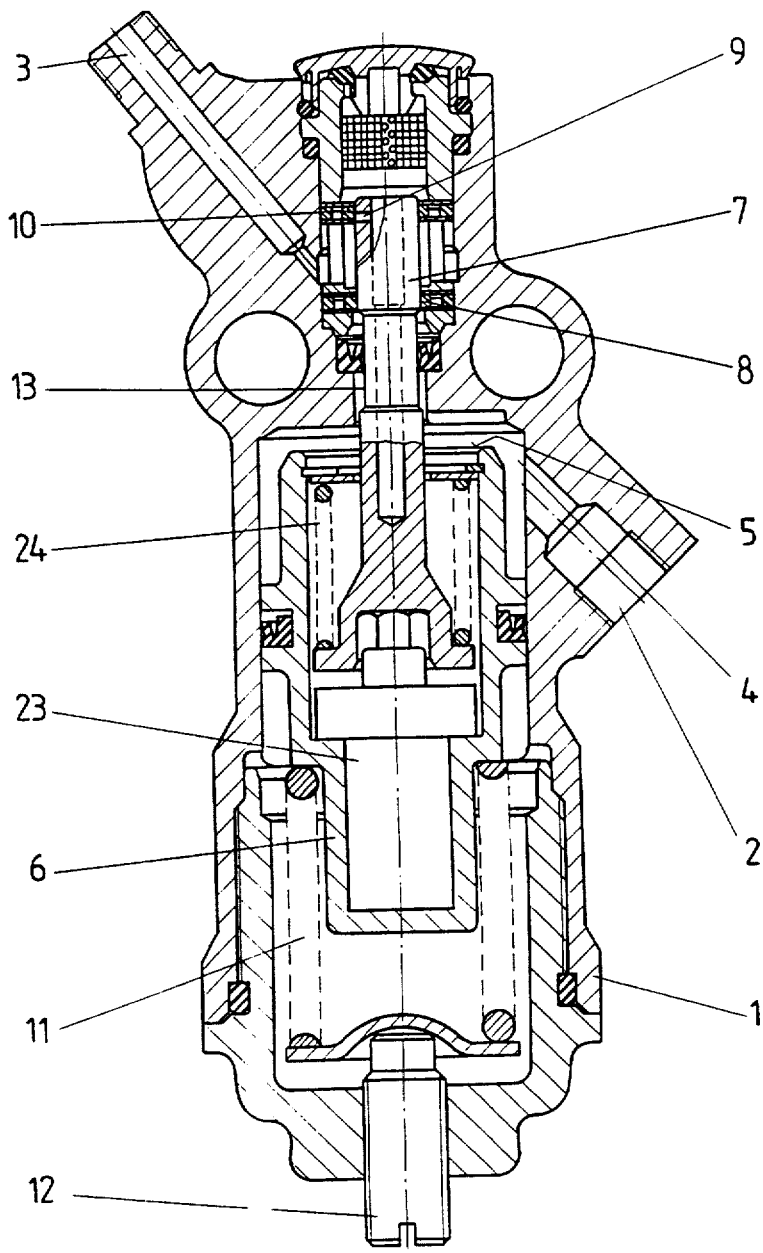

FIGS. 2, 3, and 4 illustrate the device for pressure surveillance according to FIG. 1, however, with differently shaped, thermally reacting elements. In the FIGS. 1 through 4, the same or analogous device components are designated with the same reference numerals.

The device according to FIG. 2 is furnished with a temperature-sensitive device, where said temperature-sensitive device is formed by thermally reacting disks 19. The shape change of the thermally reacting disks 19, resulting in a bulging and/or flattening of hollow, closed bodies having axial symmetry, generates longitudinal extensions of the temperature-sensitive device.

According to FIG. 3, the temperature-dependent device is formed out of thermally reacting U-shaped parts 20. The shape change of the U-shaped parts 20 can be generated by an opening and closing of the arms 21.

Depending on application requirements, the force to be exerted or relative to the longitudinal dimensional change to be generated, the shaped parts, formed as a spiral 14, disks 19, and U-shaped part 20, can be individually or multiply employed. In case of a multiple use and/or of employing a plurality of similarly shaped parts, these shaped parts can be disposed sequentially operating or parallel operating relative to each other. Finally, it is also conceivable that different shaped parts are combined with each other. Different shaped parts can further be aggregated. A restoring spring 22 provides that, upon use of the shaped parts 19, 20, in case of a temperature-dependent longitudinal dimensional shortening, the piston 6 will be induced to follow an end contact point of the shaped part or shaped parts.

The shaped parts 14, 19, 20 can be formed out of a thermally reacting compound metal or ply metal.

The arrangement according to FIG. 4 is provided with a temperature-sensitive device, where the temperature-sensitive device is formed of a so-called expansion-material work element 23, as it is known, for example, from the prospectus BTH-361-606-2000 MÜ of the company Behr-Thomson. The expansion material, enclosed in the expansion-material work element 23, has the property to change its volume depending on the temperature. This property is employed in order to generate a longitudinal expanding of the expansion-material work element 23 depending on the temperature. This longitudinal expanding serves to change to switching threshold value in the above-described manner. In case of a temperature-dependent longitudinal shortening of the expansion-material work element 23, a restoring spring 24 serves for restoring engagement or contact between the valve member 13 and the expansion-material work element 23.

The expansion-material work element 23 offers the possibility to select the expansion characteristic, depending on the temperature either linear or non-linear. As a result, the correcting parameter for the adjustment of the switching threshold value can for example be formed to act more or less with increasing temperature.

The temperature-sensitive devices 14, 19, 20, 23 are formed as intermediate members between the spring 11 and the switching device comprises of inlet valve 7, 8 and outlet valve 9, 10, and are connected in series with the spring 11. It is also conceivable that the temperature-sensitive devices 19, 20, 23, connected in series with the spring 11, are disposed between the set screw 12 and the spring 11.

The mode of operation of the device is as follows: Under a preset operating condition, the nominal pressure is present in the pressure chamber 4. This nominal pressure corresponds, for example, to the pressure of a vehicle tire. The piston 6 is moved with the nominal pressure against the force of the spring 11 into a position, wherein the inlet valve 7, 8 is closed and wherein the outlet valve 9, 10 is open. Upon lowering of the nominal pressure at the inlet 2, for example in case of a defective tire, there prevails the force of the spring 11 until there finally occurs an opening of the inlet valve 7, 8 and a closing of the outlet valve 9, 10. Based on the connection of the inlet 2 to the outlet 3 via the inlet valve 7, 8, a signal pressure is present at the outlet 3. This signal pressure signals the pressure drop below the nominal pressure. By restoring the nominal pressure, the valve device comprises of inlet valve 7, 8 and outlet valve 9, 10 assumes the initial position, wherein the outlet 3 is connected to the atmosphere.

It is effected with the temperature-sensitive device 14, 19, 20, 23 that the valve member 13 does not change relative to its position with regard to the valve device 7, 8; 9, 10 despite a temperature-dependent pressure change, which acts on the movable wall 5. The response characteristics of the switching device are therefore maintained despite a temperature-caused deviation from the nominal pressure.

The switching device can also be formed as an electrical circuit. In this case, instead of the valve device 7, 8; 9, 10, an electric switch could be for example mounted and assembled. The actuation of the switch could be performed with a correspondingly formed switching pin which would take the place of the valve member 13. The pressure drop below the nominal pressure would then be indicated by an electrical signal.

The temperature-sensitive device can comprise thermally-reacting elements and can be formed by a spiral 14, by disks 19, by a U-shaped part 20, or by an expansion-material work element 23, respectively.

The intermediate member of the temperature-sensitive device can be formed by a spiral 14, by disks 19, by a U-shaped part 20, or by an expansion-material work element 23, respectively.

Thermally-reacting shaped parts can be comprised of a spiral 14, disks 19, or a U-shaped part 20, respectively.

A linear device can comprise a screw bolt 18 and a nut 17.

The pressure measurement device can be formed by a piston 6 and a spring 11.

The valve device can be formed by inlet valve 7, 8 and outlet valve 9, 10.

The switching device can be comprised of inlet valve 7, 8, outlet valve 9, 10, and piston 6.

It will be understood that each of the elements described above, or two or more together, may also find a useful application in other types of surveillance devices differing from the types described above.

While the invention has been illustrated and described as embodied in the context of a device for the surveillance of a gas-filled chamber to monitor leaks in a vehicle tire, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

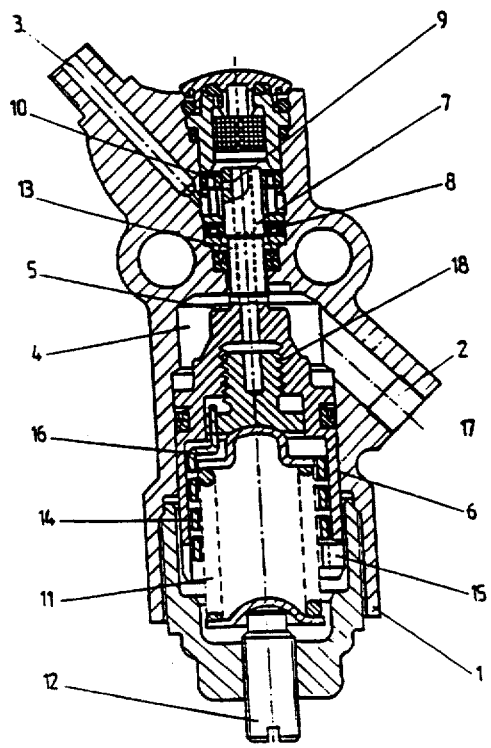

What is claimed as new and desired to be protected by Letters Patent is set forth in the appended claims:

1. A device for monitoring of sealing properties of a gas-filled chamber comprising
   a spring;
   a piston loaded with the spring and connected to a gas-filled chamber thereby forming a measurement device, wherein the piston receives the gas pressure against a force of the spring for measuring the gas pressure prevailing in the chamber and for furnishing a measurement signal;
   a switching device operationally connected to the pressure measurement device for receiving the measurement signal, wherein the switching device serves for functionally employing the measurement signal of the pressure measurement device;
   a temperature-sensitive device formed by an intermediate member disposed between the spring and the switching device for modifying of a switching threshold value, wherein the temperature-sensitive device changes its longitudinal dimension depending on temperature.

2. The device according to claim 1, further comprising
   means for setting the switching threshold for the switching device, wherein the switching threshold corresponds to a preset nominal gas density for a certain gas type in the chamber.

3. The device according to claim 1, wherein the temperature sensitive device is constructed such as to compensate the change of the spring length, generated by a force change on the piston induced by a change in the gas pressure of a gas of nominal gas density in the chamber corresponding to a temperature change, by a corresponding opposite length change as compared to the spring length.

4. The device according to claim 1, wherein the temperature-sensitive device maintains the switching threshold such as to correspond substantially to a certain gas density value of a certain gas type in the chamber.

5. The device according to claim 1, wherein the chamber is to be furnished by a vehicle tire containing a certain gas type, and wherein the switching threshold corresponds to a preset nominal gas density value in the vehicle tire for said certain gas type, wherein the preset nominal gas density value is sufficiently high as to still allow tire operation over a range of desired vehicle tire temperatures.

6. The device according to claim 1, wherein the temperature-sensitive device is formed by at least one thermally-reacting shaped part, wherein the temperature-dependent dimensional change of the shaped part serves for generating a contact position change adjusting the switching threshold depending on the pressure of the gas.

7. The device according to claim 6, wherein the thermally-reacting shaped part is formed out of a bimetal sheet.

8. The device according to claim 1, wherein the shaped part is formed as a spiral having a first spiral end and having a second spiral end, and wherein a torsioning motion of the first spiral end relative to the second spiral end can be generated based on the temperature-dependent dimensional change of the shaped part.

9. The device according to claim 8, wherein the shaped part is formed as a spiral in the kind of a helical spring.

10. The device according to claim 9, wherein one of the spiral ends is rigidly clamped, and further comprising means for transforming the torsioning motion of the free spiral end into a longitudinal linear motion.

11. The device according to claim 10, wherein the means for transforming the torsioning motion of the free spiral end into the longitudinal linear motion is formed by a linear drive, and wherein the linear drive is in operating connection with the free spiral end.

12. The device according to claim 11, wherein the linear drive is formed in the kind of a screw bolt—nut —connection.

13. The device according to claim 1, wherein the temperature-sensitive device is formed by at least one disk, and wherein a form change of the disk is a change in a degree of bulging of the disk.

14. The device according to claim 1, wherein the temperature-sensitive device is formed by at least one U-shaped part having two arms, and wherein a form change of the U-shaped part can be generated by an opening and a closing of its arms.

15. The device according to claim 1, wherein the temperature-sensitive device is formed by an expansion-material work element exhibiting a temperature-sensitive longitudinal dimension change.

16. The device according to claim 15, wherein the longitudinal dimension change of the expansion-material work element is linear relative to a temperature change.

17. The device according to claim 15, wherein the longitudinal dimension of the expansion-material work element is substantially proportional to the absolute temperature of the expansion-material work element over an operating range of the expansion-material work element.

18. The device according to claim 15, wherein the longitudinal dimension change of the expansion-material work element is non-linear relative to a temperature change.

19. The device according to claim 1, wherein the device serves for monitoring sealing properties of a vehicle tire.

20. A device for monitoring of sealing properties of gas-filled chamber, wherein
   a) a pressure measurement device for measuring a gas pressure prevailing in the chamber is furnished;
   b) the pressure measurement device is placed in an operating connection with a switching device, which switching device serves for evaluation of the measurement signal of the pressure measurement device;
   c) the switching device exhibits a switching threshold, which switching threshold corresponds to a preset nominal gas pressure;
   d) a temperature-sensitive device is furnished for a temperature-dependent change of the switching threshold; wherein
   e) the pressure measurement device is formed by a piston (6) loaded with a spring (11), where the piston (6) receives the gas pressure against the force of the spring (11);
   f) the temperature-sensitive device for the changing of the switching threshold value is formed by an intermediate member (14, 19, 20, 23) disposed between the spring (11) and the switching device, changing its longitudinal dimension depending on temperature, where the intermediate member (14, 19, 20, 23) is moved with the spring (11) generating the spring force.

21. The device according to claim 20, wherein the temperature-sensitive device is formed by at least one thermally reacting shaped part (14, 19, 20), wherein the temperature-dependent dimensional change of the shaped part (14, 19, 20) serves for generating a contact position change adjusting the switching threshold.

22. The device according to claim 21, wherein the thermally-reacting shaped part (14, 19, 20) is formed out of a bi-metal.

23. The device according to claim 20, wherein the shaped part (14) is formed as a spiral, and wherein a torsioning motion of spiral ends (15, 16) relative to each other and toward each other can be generated based on the temperature-dependent dimensional change of the shaped part (14).

24. The device according to claim 23, wherein the shaped part (14) is formed as a spiral in the kind of a helical spring.

25. The device according to claim 24, wherein one of the spiral ends (15, 16) is rigidly clamped, and wherein means are furnished which allow the transformation of the torsioning motion of the free spiral end (16) into a longitudinal linear motion.

26. The device according to claim 24, wherein the means for transformation of the torsioning motion of the free spiral end (16) into the longitudinal linear motion is formed by a linear drive (18, 17), and wherein linear drive (18 17) is in operating connection with the free spiral end (16).

27. The device according to claim 26, wherein the linear drive is formed in the kind of a screw bolt (18)—nut (17)—connection.

28. The device according to claim 20, wherein the temperature-sensitive device is formed by at least one disk (19), where a form change of the disk (19) can be generated by a bulging of the disk.

29. The device according to claim 20, wherein the temperature-sensitive device is formed by at least one U-shaped part (20), where a form change of the U-shaped part (20) can be generated by an opening and a closing of its arms (21).

30. The device according to claim 20, wherein the temperature-sensitive device is formed by an expansion-material work element (23) exhibiting a temperature-sensitive longitudinal dimension change.

31. The device according to claim 30, wherein the longitudinal dimension change of the expansion-material work element (23) is linear relative to temperature change.

32. The device according to claim 30, wherein the longitudinal dimension change of the expansion-material work element (23) is a non-linear relative to temperature change.

33. The device according to claim 20, wherein the device serves for monitoring sealing properties of a vehicle tire.

34. A device for monitoring of sealing properties of a gas-filled chamber comprising
   a spring;
   a piston loaded with the spring and connected to a gas-filled chamber thereby forming a measurement device, wherein the piston receives the gas pressure against a force of the spring for measuring the gas pressure prevailing in the chamber and for furnishing a measurement signal;
   a switching device operationally connected to the pressure measurement device for receiving the measurement signal, wherein the switching device serves for functionally employing the measurement signal of the pressure measurement device;
   a temperature-sensitive device formed by an intermediate member disposed between the spring and the switching device for modifying of a switching threshold value, wherein the temperature-sensitive device changes its longitudinal dimension depending on temperature, wherein the intermediate member is moved with the spring generating the spring force.

* * * * *

UNITED STATES PATENT AND TRADEMARK OFFICE
CERTIFICATE OF CORRECTION

PATENT NO.  : 5,226,315
DATED       : July 13, 1993
INVENTOR(S) : Peter Bartscher, et al It is certified that error appears in the above-indentified patent and that said Letters Patent is hereby corrected as shown below:

The title page, should be deleted to be replaced with the attached title page.

The drawing sheets, consisting of Figs. 1 - 4, should be deleted to be replaced with the drawing sheets, consisting of Figs. 1 - 4, as shown on the attached pages.

Column 7, line 63, delete "ply metal" and substitute therefor --bi metal--.

Signed and Sealed this

Fifteenth Day of November, 1994

Attest:

BRUCE LEHMAN

Attesting Officer    Commissioner of Patents and Trademarks

United States Patent [19]

Bartscher et al.

[11] Patent Number: 5,226,315

[45] Date of Patent: Jul. 13, 1993

[54] DEVICE FOR SURVEILLANCE OF A GAS-FILLED CHAMBER TO MONITOR LEAKS

[75] Inventors: Peter Bartscher, Hanover; Gerhard Stegemann, deceased, late of Salzhemmendorf by Marita Stegemann, legal representative and Ursula Stegemann, legal representative; Günther Singbartl, Hanover; Helmut Ulrich, Springe, all of Fed. Rep. of Germany

[73] Assignee: WABCO Westinghouse Fahrzegbremsen GmbH, Hanover, Fed. Rep. of Germany

[21] Appl. No.: 597,732

[22] Filed: Oct. 15, 1990

[30] Foreign Application Priority Data

Oct. 14, 1989 [DE] Fed. Rep. of Germany ...... 3934415

[51] Int. Cl.⁵ .................... B60C 23/04; G01L 7/16; G01L 19/04
[52] U.S. Cl. .................... 73/48; 73/146.8; 200/61.25
[58] Field of Search ............ 73/146.8, 48, 40; 340/442; 200/61.25

[56] References Cited

U.S. PATENT DOCUMENTS

| 4,143,545 | 3/1979 | Sitabkhan | 73/146.8 |
| 4,254,312 | 3/1981 | Migrin et al. | 73/146.8 X |
| 4,335,283 | 6/1982 | Migrin | 73/146.8 X |
| 4,686,855 | 8/1987 | Smith | 73/146.8 |

FOREIGN PATENT DOCUMENTS 3525672 1/1987 Fed. Rep. of Germany ..... 73/146.8

Primary Examiner—Hezron E. Williams
Assistant Examiner—Joseph W. Roskos
Attorney, Agent, or Firm—Horst M. Kasper

[57] ABSTRACT

A device for monitoring the sealing properties of a gas-filled chamber is provided. The temperature-sensitive device is formed out of a thermally-reacting element (14, 19, 20, 24). The element changes its dimensional length depending on a temperature change. The element (14, 19, 20, 24) is disposed between a pressure measurement device (6, 11) and a valve (7, 8; 9, 10), serving as a signal generator. The device can be used for a monitoring of the pressure in a vehicle tire or of the gas density in a vehicle tire.

34 Claims, 4 Drawing Sheets